United States Patent Office.

OSCAR DOEBNER, OF BERLIN, PRUSSIA, AND WILHELM VON MILLER, OF MUNICH, BAVARIA, GERMANY.

FORMATION OF METHOXY AND ETHOXY CHINALDINE.

SPECIFICATION forming part of Letters Patent No. 316,248, dated April 21, 1885.

Application filed February 14, 1884. (No specimens.) Patented in Germany August 19, 1882, No. 24,317, and October 2, 1883, No. 29,819; in Belgium February 21, 1883, No. 60,517; in France February 21, 1883, No. 153,873; in Italy February 21, 1883, XXX, 157; XVI, 15,147; in England February 21, 1883, No. 956; in Luxemburg February 22, 1883, No. 255, and in Austria-Hungary September 16, 1884, No. 26,849 and No. 41,286.

*To all whom it may concern:*

Be it known that we, OSCAR DOEBNER, a subject of the Duke of Sachsen-Meiningen, residing at Berlin, Prussia, German Empire, and WILHELM VON MILLER, a subject of the King of Bavaria, residing at Munich, Bavaria, German Empire, have invented certain new and useful Improvements in the production of Oxy, Methoxy, and Ethoxy Chinaldine; and we do hereby declare the following to be a full, clear, and exact description of the invention, such as will enable others skilled in the art to which it appertains to make and use the same.

This invention relates to the formation of oxy, methoxyl, and ethoxyl derivatives of chinaldine.

In our application for patent filed February 23, 1883, Serial No. 85,968, Patent No. 309,935, we have described a process of obtaining or formation of chinaldine bases, and have therein stated that the bases so obtained may be converted into oxychinaldines and their methyl and ethyl ethers. It has, however, been found that chinaldine ($C_{10}H_9N$) exists in coal-tar, together with chinoline, ($C_9H_7N$,) and can be separated from the latter. The derivatives hereinafter described may therefore be obtained from the destructive distillate of coal-tar, as well as the chinaldine prepared as described in the application for patent referred to. These derivatives of chinaldine may be obtained in two ways—namely, first, from the sulpho-acid of the chinaldines by melting the same with alkali, and subsequent alkylation of the oxychinaldines formed; second, by the action of aldehyde or the salts of amidophenols, amidophenol methyl, and amidophenol ethyl ethers.

According to the first method of our invention chinaldine or methylated chinaldine is mixed with an excess of fuming sulphuric acid or sulphuric acid chlorhydrine, in about the proportion of ten parts of the former to one hundred parts of the acid, and heated until all the chinaldine has been converted into the sulpho-acid. The reaction takes place at greatly-varying temperatures already at or below 100°, and the temperature may be raised to 150°. By the reaction three isomeric mono-sulpho-acids are simultaneously formed, ($HSO_3$) $C_{10}H_8O$—namely, an ortho, a meta, and a para acid, of which one or the other predominates, according to the temperature applied. The ortho and para acids are preferably formed at lower temperatures, and the meta acid at higher temperatures. The separation of these acids is effected by treatment with water, in which they are more or less soluble—namely, the para-acid is more soluble than the ortho-acid, and the latter is more soluble than the meta-acid. The sulpho-acids so obtained are then converted into lime salts, and the latter by means of carbonate of soda into soda salts. The soda salts are then melted with about four times their volume of caustic soda. The caustic compound is then slaked in water, carefully neutralized with sulphuric acid, and the separated oxychinaldine purified by distillation.

The formation of the oxychinaldines takes place according to the following equation:
$(HSO_3)COH_8N + 2NaOH = (OH)C_{10}H_8N + Na_2SO_3 + H_2O.$ The ortho-acid produces by melting with alkali the ortho-oxychinaldine, $(OH)C_{10}H_8N$, which melts at 74° centigrade. The meta-acid produces a meta-oxychinaldine that melts at about 230° centigrade, and the para-acid a para-oxychinaldine that melts at about 213° centigrade.

By the process described above sulpho-acids, and consequently the oxychinaldines, may also be formed or produced from the chinaldine bases, ($CH_3$)$C_{10}H_8N$, derived from toluidine, xylidine, cumidine, and naphthylamines.

The oxychinaldines may be converted into methoxy or ethoxy chinaldine by treatment with methyl or ethyl iodides, or the chlorides of their alkyles.

The sulpho-acids above described may also be produced or formed by heating the sulpho-acids of aniline or toluidine or xylidine with aldehyde and hydrochloric acid, and in this manner chinaldine sulpho-acids are obtained, which may then be converted into oxy, methoxyl, and ethoxyl derivatives by the process specified.

The formation of the chinaldine sulpho-acids takes place according to the following equation:

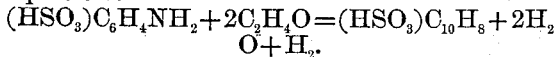

As an example for this method the following proportions may be given, namely: one hundred and fifty parts of sulpho-acid, one hundred and twenty parts paraldehyde, and one hundred and fifty parts hydrochloric acid are heated, the product dissolved in hot water and filtered, and the filtered solution evaporated to dryness for the purpose of eliminating the hydrochloric acid.

Instead of hydrochloric acid, other acids and water-absorbents may be employed. Instead of paraldehyde, ordinary aldehyde, acetal, aldol, or lactic acid may be used.

The remaining chinaldine sulpho-acid, which is readily soluble in water, can be purified by converting it into a lime salt and soda salt. By melting the latter salt with caustic soda para-oxychinaldine is obtained.

Secondly. The methoxy and ethoxy chinaldine may be obtained by treating the salts of amidophenols, amidophenol ethers, and amidophenol ethyl ether with acetaldehyde, according to the following equations:

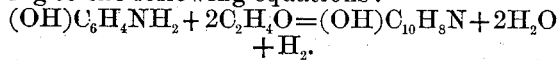
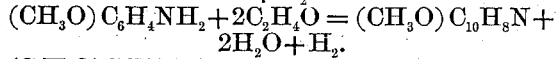
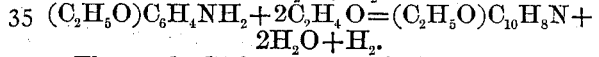

The method of obtaining the latter bodies is as follows: One hundred and fifteen parts amidophenol, or amidophenol ether, or amidophenol hydrochloric acid, and two to five parts of chloride of aluminium, are boiled for about six hours. The compound is then thinned out with water, filtered, and neutralized with carbonate of soda, and the base obtained is purified by distillation.

The above-described proportions and chemicals have given excellent results, though they may be varied. For example, instead of paraldehyde, ordinary aldehyde acetal, croton aldehyde, aldol, or lactic acid may be employed, with perhaps less favorable results.

Instead of hydrochloric acid, concentrated sulphuric acid and phosphoric acid may be used.

The reaction will also take place without chloride of aluminium, though not quite as rapidly, and other metallic salts may be employed instead of the chloride of aluminium with equally good results—as, for instance, chloride of zinc or chloride of tin, or the metals themselves.

The oxy, methoxy, and ethoxy chinaldines are solid bodies that distill without decomposition at high temperatures. Ethoxychinaldine, $(OH)C_{10}H_8N$, forms colorless needles that melt at 72° centigrade. Para-oxychinaldine, $(OH)C_{10}H_8N$, also forms colorless needles that melt at 213° centigrade, and methoxychinaldine, $(CH_3O)C_{10}H_8$, forms large shining prisms that melt at 125° centigrade. From these bases coloring-matter may be obtained, or they may be employed for antiseptic and antipyretic purposes.

Having thus described our invention, what we claim is—

As new chemical products, the herein-described oxy, methyl, and ethyl derivatives of chinaldine, substantially as set forth.

In testimony whereof we affix our signatures in presence of witnesses.

OSCAR DOEBNER.
WILH. VON MILLER.

Witnesses:
ADOLF DEMELIUS,
B. ROI,
JOS. W. HARPER,
EMIL HENZEL.